United States Patent
Hui et al.

(10) Patent No.: US 7,676,611 B2
(45) Date of Patent: Mar. 9, 2010

(54) METHOD AND SYSTEM FOR PROCESSING OUT OF ORDERS FRAMES

(75) Inventors: Ben K. Hui, Irvine, CA (US); Sanjaya Anand, Coto de Caza, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 432 days.

(21) Appl. No.: 10/956,955

(22) Filed: Oct. 1, 2004

(65) Prior Publication Data

US 2006/0075165 A1   Apr. 6, 2006

(51) Int. Cl.
G06F 3/00 (2006.01)
G06F 5/00 (2006.01)

(52) U.S. Cl. .................. 710/58; 710/5; 710/6; 710/7; 710/30; 710/52; 710/53; 710/54; 710/55; 710/56; 710/57; 711/158; 712/E9.049

(58) Field of Classification Search ............... 710/1–74; 370/394; 711/158; 712/E9.049
See application file for complete search history.

(56) References Cited

U.S. PATENT DOCUMENTS

| | | | |
|---|---|---|---|
| 4,162,375 A | 7/1979 | Schlichte | |
| 4,268,906 A | 5/1981 | Bourke et al. | |
| 4,333,143 A | 6/1982 | Calder | |
| 4,425,640 A | 1/1984 | Philip et al. | |
| 4,449,182 A | 5/1984 | Rubinson | |
| 4,546,468 A | 10/1985 | Christmas et al. | |
| 4,549,263 A | 10/1985 | Calder | |
| 4,569,043 A | 2/1986 | Simmons et al. | |
| 4,725,835 A | 2/1988 | Schreiner et al. | |

(Continued)

FOREIGN PATENT DOCUMENTS

EP    0738978    10/1996

(Continued)

OTHER PUBLICATIONS

Clark, Tom, "Zoning for Fibre Channel Fabrics", *Vixel Corporation Paper- XP002185194*, (Aug. 1999), 1-6.

(Continued)

*Primary Examiner*—Henry W. H. Tsai
*Assistant Examiner*—Steven G Snyder
(74) *Attorney, Agent, or Firm*—Klein, O'Neill & Singh, LLP

(57) ABSTRACT

A method and system for processing out of order frames received by a host bus adapter is provided. The method includes, determining if a current frame is out of order; determining if a frame is within a range of transfer for an Exchange; and creating (or appending if not the first out-of-order frame) an out of order list if the current frame is a first out of order frame. The method also includes, determining if an entry in an out of order list has a relative offset value of zero; determining if at least one entry has a relative offset value equal to a total transfer length of an Exchange; and determining if every non-zero starting relative offset has a matching entry. The method also scans an out of order list and combines a last entry with an entry whose starting point matches the end point of the last entry.

21 Claims, 11 Drawing Sheets

U.S. PATENT DOCUMENTS

| | | | |
|---|---|---|---|
| 4,777,595 A | 10/1988 | Strecker et al. | |
| 4,783,730 A | 11/1988 | Fischer | |
| 4,783,739 A | 11/1988 | Calder | |
| 4,803,622 A | 2/1989 | Bain, Jr. et al. | |
| 4,821,034 A | 4/1989 | Anderson et al. | |
| 5,129,064 A | 7/1992 | Fogg, Jr. et al. | |
| 5,144,622 A | 9/1992 | Takiyasu et al. | |
| 5,151,899 A * | 9/1992 | Thomas et al. | 370/394 |
| 5,212,795 A | 5/1993 | Hendry | |
| 5,249,279 A | 9/1993 | Schmenk et al. | |
| 5,276,807 A | 1/1994 | Kodama et al. | |
| 5,321,816 A | 6/1994 | Rogan et al. | |
| 5,347,638 A | 9/1994 | Desai et al. | |
| 5,367,520 A | 11/1994 | Cordell | |
| 5,371,861 A | 12/1994 | Keener et al. | |
| 5,448,702 A | 9/1995 | Garcia, Jr. et al. | |
| 5,568,614 A | 10/1996 | Mendelson et al. | 709/231 |
| 5,588,000 A * | 12/1996 | Rickard | 370/428 |
| 5,598,541 A | 1/1997 | Malladi et al. | |
| 5,610,745 A | 3/1997 | Bennett | |
| 5,647,057 A | 7/1997 | Roden et al. | |
| 5,671,365 A | 9/1997 | Binford et al. | |
| 5,687,172 A | 11/1997 | Cloonan et al. | |
| 5,740,467 A | 4/1998 | Chmielecki, Jr. et al. | |
| 5,748,612 A | 5/1998 | Stoevhase et al. | |
| 5,758,187 A | 5/1998 | Young | |
| 5,761,427 A | 6/1998 | Shah et al. | |
| 5,818,842 A | 10/1998 | Burwell et al. | |
| 5,828,903 A | 10/1998 | Sethuram et al. | |
| 5,835,496 A | 11/1998 | Yeung et al. | 370/514 |
| 5,875,343 A | 2/1999 | Binford et al. | |
| 5,881,296 A | 3/1999 | Williams et al. | |
| 5,892,969 A | 4/1999 | Young | |
| 5,905,905 A | 5/1999 | Dailey et al. | |
| 5,917,723 A | 6/1999 | Binford | 700/2 |
| 5,937,169 A | 8/1999 | Connery et al. | |
| 5,968,143 A | 10/1999 | Chisholm et al. | |
| 5,974,547 A | 10/1999 | Klimenko | 713/2 |
| 5,983,292 A | 11/1999 | Nordstrom et al. | |
| 5,987,028 A | 11/1999 | Yang et al. | |
| 5,999,528 A | 12/1999 | Chow et al. | |
| 6,006,340 A | 12/1999 | O—Connell | |
| 6,014,383 A | 1/2000 | McCarty | |
| 6,021,128 A | 2/2000 | Hosoya et al. | |
| 6,047,323 A | 4/2000 | Krause | |
| 6,049,802 A | 4/2000 | Waggener, Jr. et al. | |
| 6,055,603 A | 4/2000 | Ofer et al. | |
| 6,061,785 A * | 5/2000 | Chiarot et al. | 712/236 |
| 6,078,970 A | 6/2000 | Nordstrom et al. | |
| 6,081,512 A | 6/2000 | Muller et al. | |
| 6,085,277 A | 7/2000 | Nordstrom et al. | |
| 6,105,122 A * | 8/2000 | Muller et al. | 712/1 |
| 6,115,761 A | 9/2000 | Daniel et al. | |
| 6,118,776 A | 9/2000 | Berman | |
| 6,128,292 A | 10/2000 | Kim et al. | |
| 6,134,617 A * | 10/2000 | Weber | 710/105 |
| 6,138,176 A | 10/2000 | McDonald et al. | |
| 6,144,668 A | 11/2000 | Bass et al. | |
| 6,160,813 A | 12/2000 | Banks et al. | |
| 6,185,620 B1 | 2/2001 | Weber et al. | 709/230 |
| 6,209,089 B1 | 3/2001 | Selitrennikoff et al. | 713/2 |
| 6,233,244 B1 | 5/2001 | Runaldue et al. | |
| 6,246,683 B1 | 6/2001 | Connery et al. | |
| 6,247,060 B1 | 6/2001 | Boucher et al. | |
| 6,269,413 B1 | 7/2001 | Sherlock | |
| 6,301,612 B1 | 10/2001 | Selitrennikoff et al. | 709/220 |
| 6,308,220 B1 | 10/2001 | Mathur | |
| 6,310,884 B1 * | 10/2001 | Odenwald, Jr. | 370/412 |
| 6,314,477 B1 * | 11/2001 | Cowger et al. | 710/22 |
| 6,324,181 B1 | 11/2001 | Wong et al. | |
| 6,327,625 B1 * | 12/2001 | Wang et al. | 709/235 |
| 6,330,236 B1 | 12/2001 | Ofek et al. | |
| 6,334,153 B2 | 12/2001 | Boucher et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,389,479 B1 | 5/2002 | Boucher et al. | |
| 6,393,487 B2 | 5/2002 | Boucher et al. | |
| 6,408,349 B1 | 6/2002 | Castellano | |
| 6,411,599 B1 | 6/2002 | Blanc et al. | |
| 6,424,658 B1 | 7/2002 | Mathur | |
| 6,427,171 B1 | 7/2002 | Craft et al. | |
| 6,427,173 B1 | 7/2002 | Boucher et al. | |
| 6,434,620 B1 | 8/2002 | Boucher et al. | |
| 6,434,630 B1 | 8/2002 | Micalizzi, Jr. et al. | |
| 6,449,274 B1 | 9/2002 | Holden et al. | |
| 6,457,090 B1 | 9/2002 | Young | 710/313 |
| 6,463,032 B1 | 10/2002 | Lau et al. | |
| 6,467,008 B1 | 10/2002 | Gentry et al. | |
| 6,470,173 B1 | 10/2002 | Okada et al. | |
| 6,470,415 B1 | 10/2002 | Starr et al. | |
| 6,502,189 B1 | 12/2002 | Westby | 713/1 |
| 6,504,846 B1 | 1/2003 | Yu et al. | |
| 6,546,010 B1 | 4/2003 | Merchant et al. | |
| 6,564,271 B2 | 5/2003 | Micalizzi, Jr. et al. | |
| 6,591,302 B2 | 7/2003 | Boucher et al. | |
| 6,597,691 B1 | 7/2003 | Anderson et al. | |
| 6,597,777 B1 | 7/2003 | Ho | |
| 6,606,690 B2 | 8/2003 | Padovano | 711/148 |
| 6,643,748 B1 * | 11/2003 | Wieland | 711/152 |
| 6,697,359 B1 | 2/2004 | George | |
| 6,721,799 B1 | 4/2004 | Slivkoff | 709/236 |
| 6,760,302 B1 | 7/2004 | Ellinas et al. | |
| 6,775,693 B1 | 8/2004 | Adams | |
| 6,810,440 B2 | 10/2004 | Micalizzi, Jr. et al. | |
| 6,810,442 B1 | 10/2004 | Lin et al. | |
| 6,886,141 B1 | 4/2005 | Kunz et al. | |
| 6,928,533 B1 * | 8/2005 | Eisen et al. | 712/218 |
| 6,988,130 B2 | 1/2006 | Blumenau et al. | 719/213 |
| 6,988,149 B2 | 1/2006 | Odenwald | 709/250 |
| 7,051,182 B2 | 5/2006 | Blumenau et al. | 711/202 |
| 7,155,553 B2 | 12/2006 | Lueck et al. | 710/305 |
| 7,167,929 B2 * | 1/2007 | Steinmetz et al. | 710/5 |
| 7,230,549 B1 | 6/2007 | Woodral et al. | 341/52 |
| 7,231,560 B2 | 6/2007 | Jiin et al. | 714/712 |
| 7,233,985 B2 | 6/2007 | Hahn et al. | 709/222 |
| 7,254,206 B2 | 8/2007 | Chiang | 375/371 |
| 7,287,063 B2 | 10/2007 | Baldwin et al. | 709/216 |
| 7,349,399 B1 * | 3/2008 | Chen et al. | 370/394 |
| 2001/0038628 A1 | 11/2001 | Ofek et al. | |
| 2002/0034178 A1 | 3/2002 | Schmidt et al. | |
| 2002/0147802 A1 * | 10/2002 | Murotani et al. | 709/223 |
| 2002/0194294 A1 | 12/2002 | Blumenau et al. | 709/213 |
| 2002/0196773 A1 | 12/2002 | Berman | |
| 2003/0012200 A1 * | 1/2003 | Salamat | 370/394 |
| 2003/0016683 A1 | 1/2003 | George et al. | |
| 2003/0056000 A1 | 3/2003 | Mullendore et al. | |
| 2003/0091062 A1 | 5/2003 | Lay et al. | |
| 2003/0120743 A1 | 6/2003 | Coatney et al. | 709/217 |
| 2003/0120983 A1 | 6/2003 | Vieregge et al. | |
| 2003/0126242 A1 | 7/2003 | Chang | 709/222 |
| 2003/0126320 A1 | 7/2003 | Liu et al. | |
| 2003/0161429 A1 | 8/2003 | Chiang | 375/371 |
| 2003/0169740 A1 * | 9/2003 | Harris et al. | 370/394 |
| 2003/0172239 A1 | 9/2003 | Swank | 711/163 |
| 2003/0179748 A1 | 9/2003 | George et al. | |
| 2003/0189935 A1 | 10/2003 | Warden et al. | |
| 2003/0236953 A1 | 12/2003 | Grieff et al. | |
| 2004/0028038 A1 | 2/2004 | Anderson et al. | |
| 2004/0042458 A1 * | 3/2004 | Elzu | 370/394 |
| 2004/0054866 A1 | 3/2004 | Blumenau et al. | 711/202 |
| 2004/0107389 A1 * | 6/2004 | Brown et al. | 714/50 |
| 2004/0141521 A1 | 7/2004 | George et al. | |
| 2004/0153526 A1 | 8/2004 | Haun et al. | 709/217 |

| | | | |
|---|---|---|---|
| 2004/0160957 | A1* | 8/2004 | Coffman .................. 370/394 |
| 2005/0025152 | A1* | 2/2005 | Georgiou et al. ............ 370/394 |
| 2005/0141661 | A1 | 6/2005 | Renaud et al. |
| 2005/0286526 | A1* | 12/2005 | Sood et al. .................. 370/394 |
| 2006/0095607 | A1 | 5/2006 | Lim et al. ..................... 710/52 |
| 2006/0123298 | A1 | 6/2006 | Tseng ........................ 714/733 |
| 2006/0209735 | A1 | 9/2006 | Evoy .......................... 370/315 |
| 2006/0253757 | A1 | 11/2006 | Brink et al. ................. 714/738 |
| 2006/0268887 | A1* | 11/2006 | Lu et al. ..................... 370/394 |
| 2007/0011534 | A1 | 1/2007 | Boudon et al. .............. 714/732 |
| 2007/0124623 | A1 | 5/2007 | Tseng |
| 2007/0177701 | A1 | 8/2007 | Thanigasalam ............. 375/372 |
| 2007/0262891 | A1 | 11/2007 | Woodral et al. ............... 341/51 |

FOREIGN PATENT DOCUMENTS

| | | |
|---|---|---|
| WO | WO 95/06286 | 3/1995 |
| WO | WO 00/58843 | 10/2000 |

OTHER PUBLICATIONS

Curtis, A. R., "Design Considerations for 10-Gbit Fibre Channel", *Curtis A. Ridgeway, Distinguished I/O Architect, Storage and Computing ASIC's Division, LSI Logic Corp.*

Desanti, "Virtual Fabrics", *Virtual Fabrics, T11/03-352v0*, (May 2003),1-4.

Desanti, Claudio , "Virtual Fabrics Switch Suppport" *VF Switch Support, T11/04-395v2*, (Sep. 2004), 1-15.

Malavalli, Kumar , "Distributed Computing with Fibre Channel Fabric", *Proc. of the Computer Soc. Int'l Conf., Los Alamitos, IEEE Comp. Soc. Press., Vol. Conf. 37, XP000340745*, (Feb. 24, 1992),269-274.

Malavalli, Kumar , "High Speed Fibre Channel Switching Fabric Services", *Proceedings of the SPIE, SPIE, Bellingham, VA. USA vol. 1577.*, XP000562869, ISSN: 0277-786X,(Sep. 4, 1991),216-226.

Martin, Charles R., "Fabric Interconnection of Fibre Channel Standard Nodes", *Proceedings of the SPIE*, (Sep. 08, 1992),65-71.

Martin, "Virtual Channel Architecture", *Presentation By Brocade to T11/03-369V0*, (00/02/2003).

Melhem, et al., "Minimizing Wavelength Conversions in WDM Path Establishment", *Computer Science Department, University of Pittsburgh, Pittsburgh, PA 15260*, (2001), 197-211.

Pelissier, "Inter-Fabric Routing", *Inter Fabric Routing (04-520v0)*, (Jul. 30, 2004), 1-31.

Ridgeway, Curt , "0GFC-40GFC using 4-lane XAUI's", *LSI Logic Presentation—T11/03-069v0*.

Yoshida, Hu , "LUN Security Considerations for Storage Area Networks", *Hitachi Data Systems Paper—XP 002185193 (1999)*, 1-7.

International Preliminary Report on Patentability dated Apr. 3, 2007, for International patent application No. PCT/US2005/035064.

International Preliminary Report on Patentability dated Mar. 13, 2007, for International patent application No. PCT/US2005/031661.

"Office Action from USPTO dated Feb. 1, 2007 for U.S. Appl. No. 10/935,919".

"Office Action from USPTO dated Oct. 2, 2007 for U.S. Appl. No. 10/935,919".

"Office Action from USPTO dated Apr. 6, 2007 for U.S. Appl. No. 10/956,718".

"Office Action from the USPTO dated Jan. 4, 2008 for U.S. Appl. No. 11/039,189".

"Notice of Allowance from USPTO dated Apr. 9, 2008 for U.S. Appl. No. 11/039,189".

"Office Action from USPTO dated Apr. 16, 2008 for U.S. Appl. No. 10/935,919".

"Office Action from USPTO dated Apr. 4, 2008 for U.S. Appl. No. 10/957,465".

"Final Office Action from USPTO dated Nov. 26, 2008 for U.S. Appl. No. 10/935,919".

"Notice of Allowance from European Patent Office dated Oct. 22, 2008 for European Application No. 05794988.5".

"English Translation of Office Action dated Jun. 19, 2009 from State Intellectual Property Office for Chinese Application No. 200580032948.4".

"Office Action from China State Intellectual Property Office dated Dec. 11, 2009 for Chinese Application No. 200580032948.4 with English Translation".

"Notice of Allowance from USPTO dated Jun. 11, 2009 for U.S. Appl. No. 10/935,919".

* cited by examiner

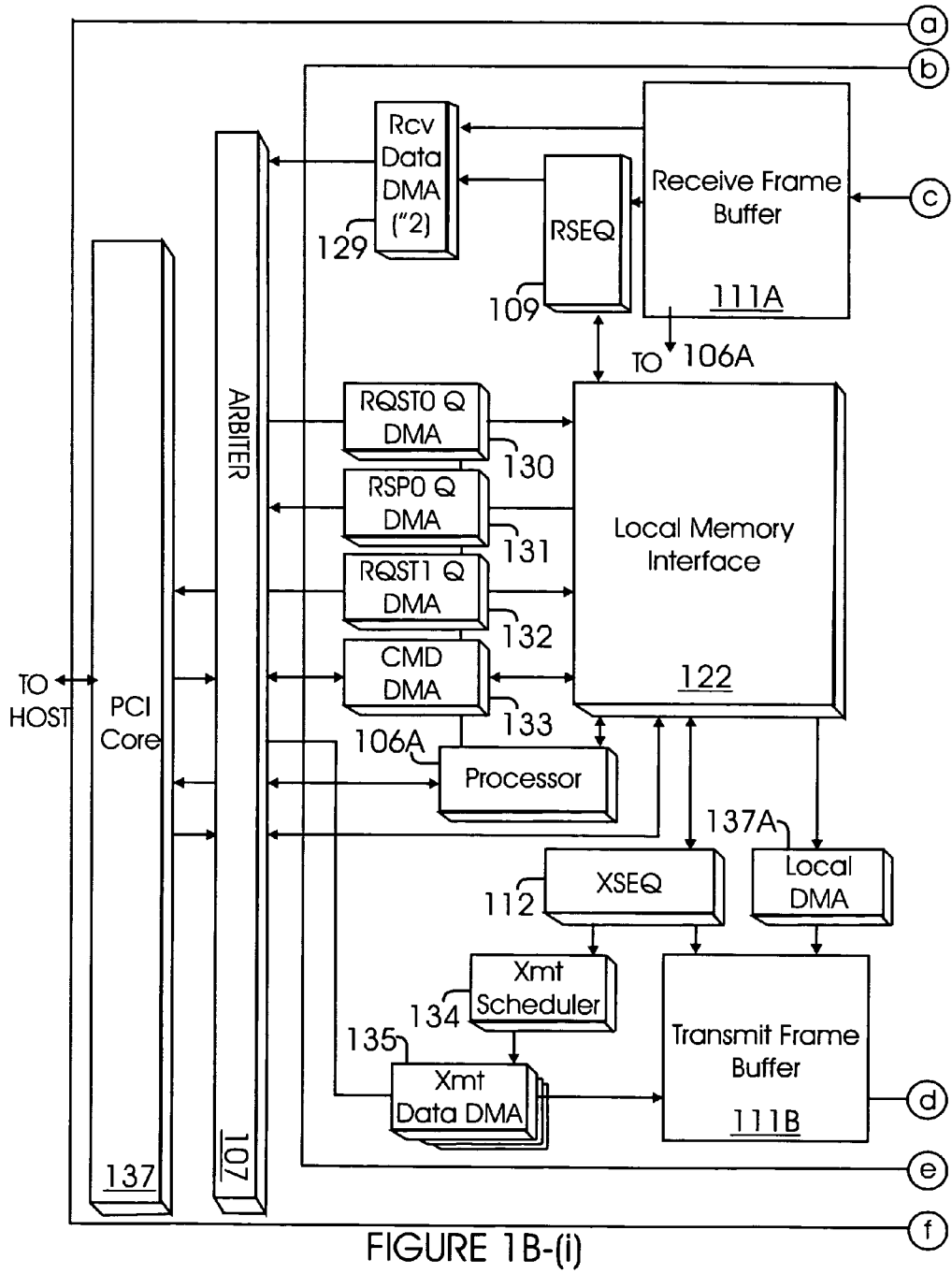
FIGURE 1B-(i)

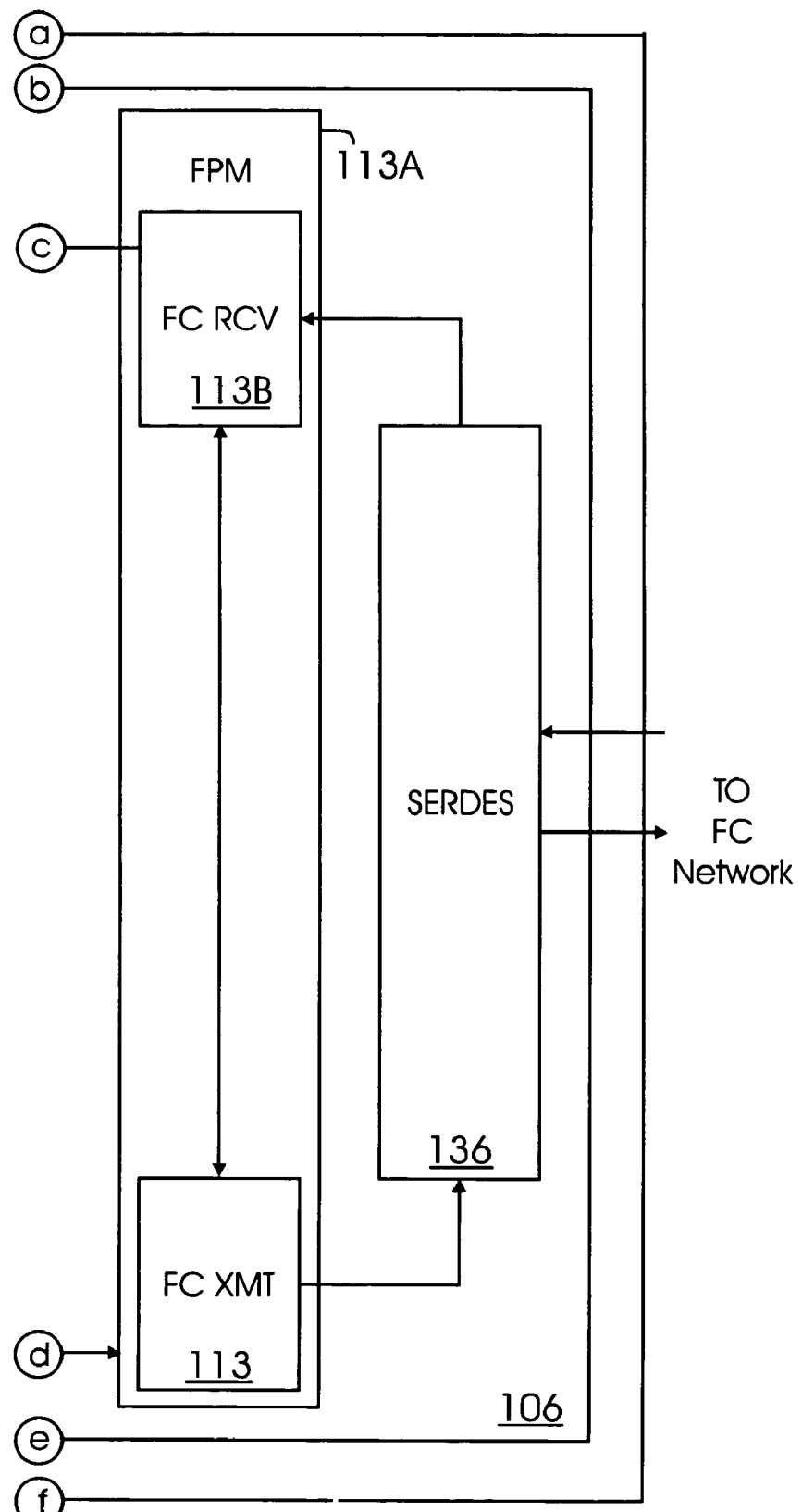
FIGURE 1B-(ii)

| Frame # | Starting RO | Ending RO+1 |
|---|---|---|
| 1 | 0 | 0 x 800 |
| 2 | 0 x 1000 | 0 x 1800 |
| 3 | 0 x 800 | 0 x 1000 |
| 4 | 0 x 1800 | 0 x 2000 |

Out of Order List

Figure 5F

METHOD AND SYSTEM FOR PROCESSING OUT OF ORDERS FRAMES

BACKGROUND

1. Field of the Invention

The present invention relates to networking systems, and more particularly, processing out of order frames in a SCSI_FCP environment.

2. Background of the Invention

Storage area networks ("SANs") are commonly used where plural memory storage devices are made available to various host computing systems. Data in a SAN is typically moved from plural host systems (that include computer systems) to storage systems through various controllers/adapters.

Host systems often communicate with storage systems via a host bus adapter ("HBA", may also be referred to as a "controller" and/or "adapter") using the "PCI" bus interface. PCI stands for Peripheral Component Interconnect, a local bus standard that was developed by Intel Corporation®. The PCI standard is incorporated herein by reference in its entirety. Most modern computing systems include a PCI bus in addition to a more general expansion bus. PCI is a 64-bit bus and can run at clock speeds of 33, 66 or 133 MHz.

PCI-X is another standard bus that is compatible with existing PCI cards using the PCI bus. PCI-X improves the data transfer rate of PCI from 132 MBps to as much as 1 gigabits per second. The PCI-X standard was developed by IBM®, Hewlett Packard Corporation® and Compaq Corporation® to increase performance of high bandwidth devices, such as Gigabit Ethernet standard and Fibre Channel Standard, and processors that are part of a cluster.

Various other standard interfaces are also used to move data from host systems to storage devices. Fibre channel is one such standard. Fibre channel (incorporated herein by reference in its entirety) is an American National Standard Institute (ANSI) set of standards, which provides a serial transmission protocol for storage and network protocols such as HIPPI, SCSI, IP, ATM and others. Fibre channel provides an input/output interface to meet the requirements of both channel and network users.

Fiber channel supports three different topologies: point-to-point, arbitrated loop and fiber channel fabric. The point-to-point topology attaches two devices directly. The arbitrated loop topology attaches devices in a loop. The fiber channel fabric topology attaches host systems directly to a fabric, which are then connected to multiple devices. The fiber channel fabric topology allows several media types to be interconnected.

Storage devices in a SAN may be coupled to a storage sub-system (for example a RAID system that may also use a HBA) using the Small Computer Systems Interface ("SCSI") protocol. The SCSI Fibre Channel Protocol ("SCSI_FCP") is used for communication between a SCSI device and a system using the Fibre Channel network. SCSI_FCP is a mapping protocol for applying a SCSI command set to Fibre Channel command set. Both SCSI and SCSI_FCP standard protocols are incorporated herein by reference in their entirety.

In a typical SCSI_FCP Exchange, an initiator sends a "read" or "write" command to a target. For a read operation, the target sends the requested data to the initiator. For a write command, the target sends a "Ready to Transfer" command informing the initiator that the target is ready to accept the write data. The initiator then sends the write data to the target. Once the data is transferred, the Exchange enters the response phase. The target then sends a response to the initiator with the status of the operation.

As SANs become larger and complex, frames may not arrive in order or may get dropped. The term "in-order" means that frames arrive consecutively in a serial manner. The numbers of switches that are connected in a fabric topology are increasing. This also increases delivery of out of order frames, i.e., frames that are not received in-order. The current SCSI_FCP standard and SAN systems do not handle out of order frames efficiently. If a frame is out of order or dropped, the entire Exchange operation is performed again. This causes delay and latency.

Therefore, what is required is a system and method for efficiently handling out of order frames in a SCSI_FCP environment.

SUMMARY OF THE INVENTION

In one aspect of the present invention, a method for processing out of order frames received by a host bus adapter in a SCSI_FCP environment is provided. The method includes, determining if a current frame is out of order; determining if a frame is within a range of transfer for an Exchange; creating an out of order list if the current frame is a first out of order frame; and appending an out of order list if the current frame is not the first out of order frame.

If the current frame is not within the range of transfer, then the current frame is discarded. The current frame is out of order based on a relative offset of the current frame and a frame that is processed before the current frame. If the current frame is the last frame then the out of order list is scanned to perform an integrity test.

In yet another aspect of the present invention, a method for processing out of order frames received by a host bus adapter in a SCSI_FCP environment is provided. The method includes, determining if an entry in an out of order list has a relative offset value of zero; determining if at least one entry has a relative offset value equal to a total transfer length of an Exchange; and determining if every non-zero starting relative offset has a matching entry.

In yet another aspect of the present invention, a method for processing out of order frames received by a host bus adapter in a SCSI_FCP environment is provided. The method includes, scanning an out of order list to determine if an end point of a last entry before a first out of order frame, matches a starting point of an entry; and combining the last entry with the entry whose starting point matches the end point of the last entry. The matching entry's starting point is used as a key to find a next matching entry.

In yet another aspect of the present invention, a host bus adapter ("HBA") for processing out of order frames in a SCSI_FCP environment is provided. The HBA includes, a first processor for determining if a current frame is out of order; and a second processor for determining if a frame is within a range of transfer for an Exchange; creating an out of order list if the current frame is a first out of order frame; and appending an out of order list if the current frame is not the first out of order frame.

The processor also determines if an entry in an out of order list has a relative offset value of zero; determines if at least one entry has a relative offset value equal to a total transfer length of an Exchange; and also determines if every non-zero starting relative offset has a matching entry.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1B (i)-(ii) shows a block diagram of a host bus adapter using the process steps according to one aspect of the present invention;

FIG. 5F shows an out of order frame list that is used in one aspect of the present invention to process out of order frames.

DETAILED DESCRIPTION OF THE PREFERRED EMBODIMENTS

Definitions

The following definitions are provided as they are typically (but not exclusively) used in the fiber channel environment, implementing the various adaptive aspects of the present invention.

"Exchange": Operations for a SCSI data read or write. A SCSI data read exchange consists of three operational phases: command phase, data movement phase and response phase.

"Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"Initiator": A SCSI device that initiates an input/output ("IO") operation, for example, a HBA.

"OX_ID": An Originator (i.e., a device/port that originates an exchange) Exchange identification field in a standard Fibre Channel frame header.

"N-Port": A direct fabric attached port, for example, a disk drive or a HBA.

"Port": A general reference to N. Sub.--Port or F.Sub.--Port.

"RX_ID": A responder (i.e., a device/port that responds) exchange identification field in a standard Fibre Channel frame header.

"SAN": Storage Area Network

"SCSI_FCP": A standard protocol, incorporated herein by reference in its entirety for implementing SCSI on a Fibre Channel SAN.

"S_ID": A 24-bit field in a standard Fibre Channel frame header that contains the source address for a frame.

"Target": A SCSI device that accepts IO operations from Initiators, for example, storage devices such as disks and tape drives.

To facilitate an understanding of the preferred embodiment, the general architecture and operation of a SAN, a host system and a HBA will be described. The specific architecture and operation of the preferred embodiment will then be described with reference to the general architecture of the host system and HBA.

Figure 1A:
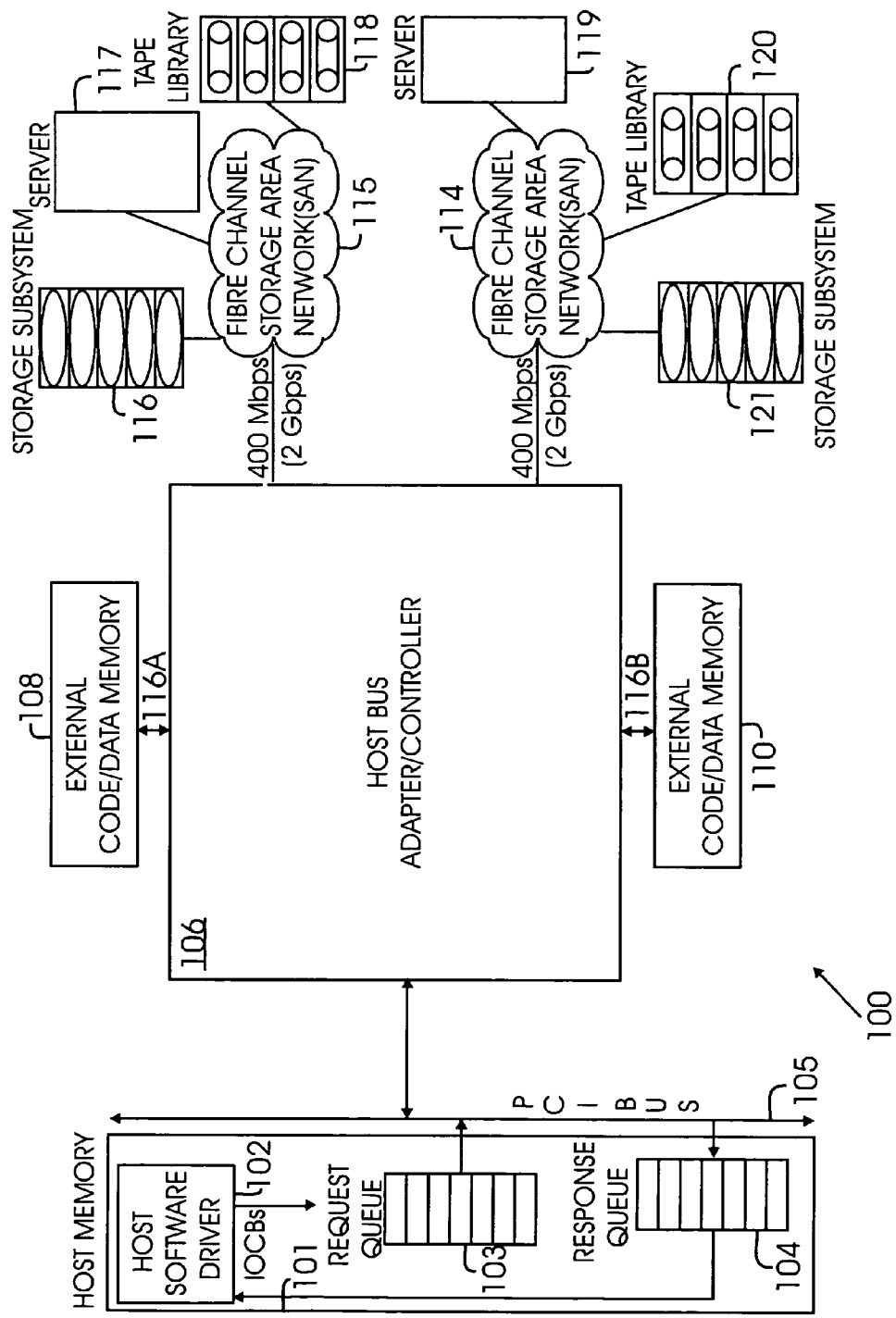
FIG. 1A shows a top-level block diagram of a network using a SAN.

SAN Overview:

FIG. 1A shows a SAN system 100 that uses a HBA 106 (referred to as "adapter 106") for communication between a host system (for example, 200, FIG. 2A) with host memory 101 to various systems (for example, storage subsystem 116 and 121, tape library 118 and 120 and servers 117 and 119) using Fibre Channel storage area networks 114 and 115. Host system 200 uses a driver 102 that co-ordinates data transfers via adapter 106 using input/output control blocks ("IOCBs").

A request queue 103 and response queue 104 is maintained in host memory 101 for transferring information using adapter 106. Host system 200 communicates with adapter 106 via a PCI bus 105 through a PCI core module (interface) 137, as shown in FIG. 1B.

Figure 2A:
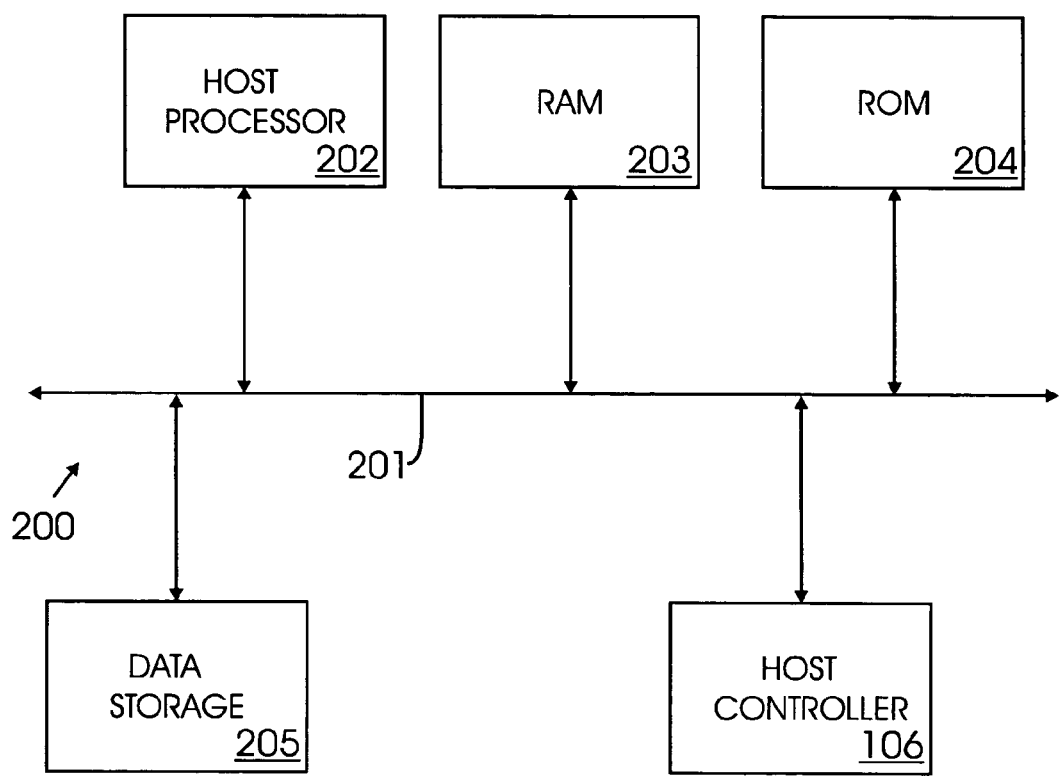
FIG. 2A shows a top-level block diagram of a host system that communicates with storage devices in a SAN.

Host System 200:

FIG. 2A shows a block diagram of host system 200 representing a computer, server or other similar devices, which may be coupled to a fiber channel fabric to facilitate communication. In general, host system 200 typically includes a host processor 202 that is coupled to computer bus 201 for processing data and instructions. In one aspect of the present invention, host processor 202 may be a Pentium Class microprocessor manufactured by Intel Corp™.

A computer readable volatile memory unit 203 (for example, a random access memory unit, also shown as system memory 101 (FIG. 1A) and used interchangeably in this specification) may be coupled with bus 201 for temporarily storing data and instructions for host processor 202 and/or other such systems of host system 200.

A computer readable non-volatile memory unit 204 (for example, read-only memory unit) may also be coupled with bus 201 for storing non-volatile data and instructions for host processor 202. Data Storage device 205 is provided to store data and may be a magnetic or optical disk.

HBA 106:

FIG. 1B shows a block diagram of adapter 106. Adapter 106 includes processors (may also be referred to as "sequencers") 109 and 112 for receive and transmit side, respectively for processing data received from storage sub-systems and transmitting data to storage sub-systems. Transmit path in this context means data path from host memory 101 to the storage systems via adapter 106. Receive path means data path from storage subsystem via adapter 106. It is noteworthy, that only one processor is used for receive and transmit paths, and the present invention is not limited to any particular number/type of processors. Buffers 111A and 111B are used to store information in receive and transmit paths, respectively.

Beside dedicated processors on the receive and transmit path, adapter 106 also includes processor 106A, which may be a reduced instruction set computer ("RISC") for performing various functions in adapter 106.

Adapter 106 also includes Fibre Channel interface (also referred to as Fibre Channel protocol manager "FPM") 113A that includes an FPM 113B and 113 in receive and transmit paths, respectively. FPM 113B and FPM 113 allow data to move to/from storage sub-systems (for example, 116, 118, 120 or 121).

Adapter 106 is also coupled to external memory 108 and 110 (referred interchangeably hereinafter) through local memory interface 122 (via connection 116A and 116B, respectively, (shown in FIG. 1A)). Local memory interface 122 is provided for managing local memory 108 and 110. Local DMA module 137A is used for gaining access to move data from local memory (108/110).

Adapter 106 also includes a serial/de-serializer (SERDES) 136 for converting data from 10-bit to 8-bit format and vice-versa.

Adapter 106 further includes request queue DMA channel (0) 130, response queue DMA channel 131, request queue (1) DMA channel 132 that interface with request queue 103 and response queue 104; and a command DMA channel 133 for managing command information.

Both receive and transmit paths have DMA modules 129 and 135, respectively. Transmit path also has a scheduler 134 that is coupled to processor 112 and schedules transmit operations. Arbiter 107 arbitrates between plural DMA channel requests.

DMA modules in general are used to perform transfers between memory locations, or between memory locations and an input/output port. A DMA module functions without involving a microprocessor by initializing control registers in the DMA unit with transfer control information. The transfer control information generally includes source address (the address of the beginning of a block of data to be transferred), the destination address, and the size of the data block.

Figure 2B:
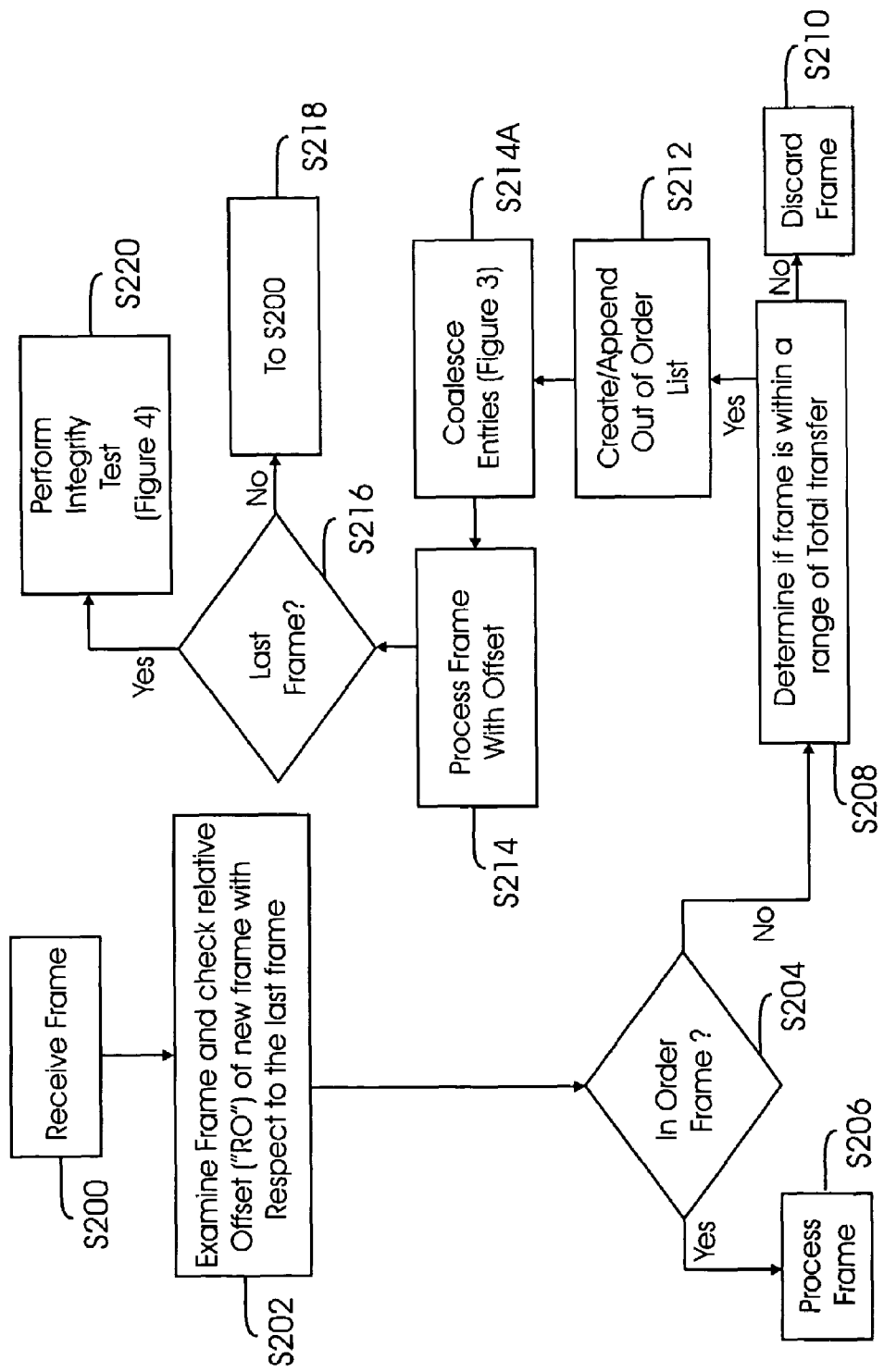
FIG. 2B shows a flow diagram of executable process steps for handling out of order packets, according to one aspects of the present invention.

Process Flow:

FIG. 2B shows a flow diagram of executable process steps for handling out of order frames, according to one aspect of the present invention. Receive Sequencer ("RSEQ") 109 detects an out or order situation during frame processing and asks processor 106A to handle the out of order situation. Processor 106A validates the relative offset ("RO") value (described below); sets up a new DMA context and allocates Out of Order list storage space in memory 108 and/or 110. Processor 106A adds an entry to the out of order list (513, FIG. 5F). RSEQ 109 uses the next context to transfer the frame; and when the frame is transferred RSEQ updates the entry in the out of order list with an ending RO+1.

Figure 5A:
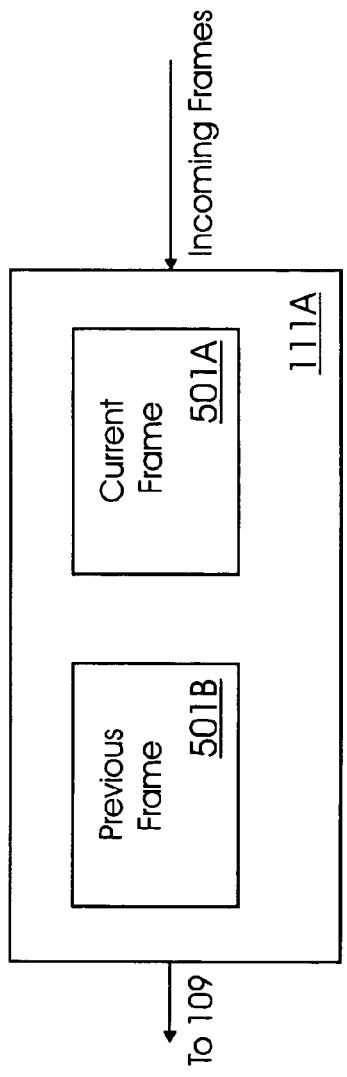
FIG. 5A shows a block diagram where a current frame is shown with respect to a previous frame in a frame buffer.

Turning in detail to FIG. 2B, in step S200, frames are received from the Fibre Channel network and stored in frame buffer 111A. FIG. 5A shows a current frame 501A and a previously processed frame as 501B.

Figure 5B:
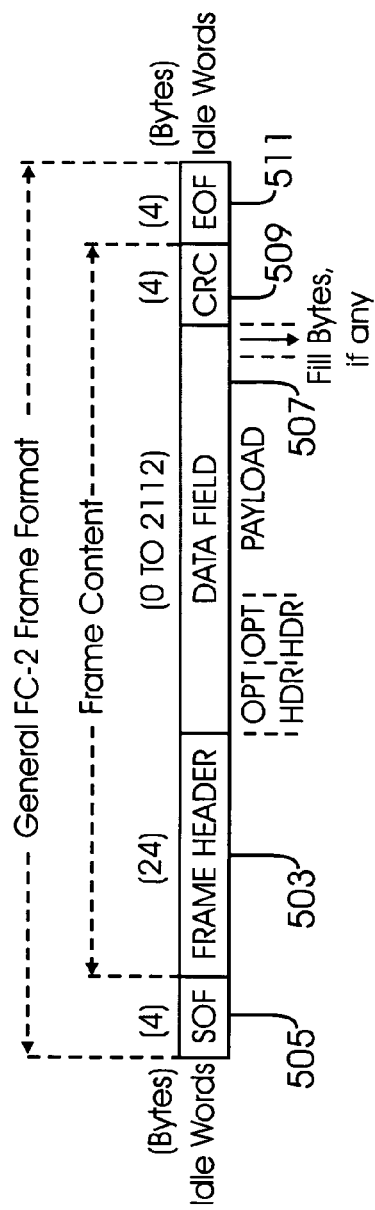
FIG. 5B shows the generic format for a Fibre Channel frame.

The received frame includes various fields. FIG. 5B shows a block diagram of a standard Fibre Channel frame with a start of frame ("SOF") field 505, a frame header 503, data payload 507, cyclic redundancy check code ("CRC") 509 and end of frame ("EOF") value 511.

Figure 5C:
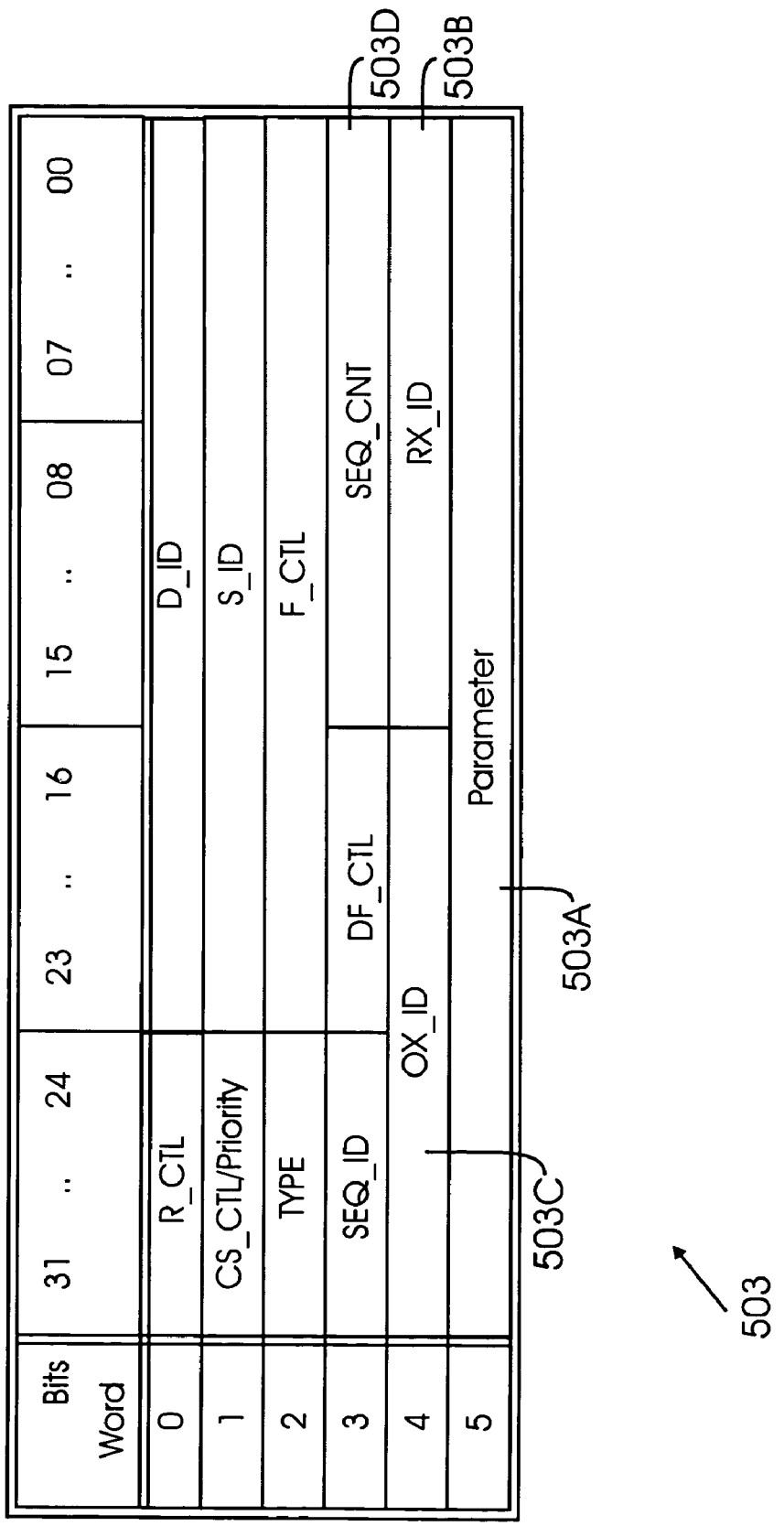
FIG. 5C shows the generic format for a Fibre Channel frame header.

FIG. 5C shows a table of a frame header 503 where the 5$^{th}$ word includes a parameter field 503A. This field includes the relative offset (may also be referred to as "RO") value for a frame, which is a defined term per FC-FS standard, incorporated herein by reference in its entirety. Relative offset is the displacement, expressed in bytes, of the first byte of a Payload 507 related to an upper level protocol defined origin for a given information category. Relative offset provides the starting point for a given frame.

In step S202, RSEQ 109 examines the OX_ID (503C) and/or RX_ID (503B) of the frame header to determine the Exchange. Every frame is received as a part of an Exchange and HBA 106 keeps track of all the Exchanges (via processor 106A). In one aspect, processor 106A can track all the Exchanges using a list in external memory 108 and/or 110. RSEQ 109 checks the relative offset of the current frame (501A) by comparing it with the relative offset of the previous frame (501B).

Based on the relative offset, in step S204, RSEQ 109 determines if the frame is in order or out of order (i.e. if the transfer is disjoint). If starting relative offset of a frame is not equal to the ending relative offset +1 of the previous frame, then the frame is out or order or the transfer is disjoint.

If the frame is in-order, then RSEQ 109 processes the frame in step S206.

If the frame is out of order, then in step S208, RSEQ 109 notifies processor 106A of the out of order frame. Processor 106A determines if the current frame 501A is within a range of the total transfer for the Exchange. This again is based on the overall Exchange information that is maintained by processor 106A in memory 108 and/or 110.

If the current frame is out of the range, then in step S210, the frame is discarded.

If the frame is within the range, then in step S212, processor 106A either creates or modifies an out of order of order frame list 513, as shown in FIG. 5F. This list 513 is maintained in memory 108 and/or 110 by processor 106A. If the current frame is the first out of order frame, then a list is created by processor 106A. If the frame is not the first out of order frame, then an existing out of order frame list is modified.

In step S214A, entries in the out or order list 513 are coalesced, as described below in FIG. 3.

In step S214, processor 106A notifies the RSEQ 109 to process the out of order frame with the relative offset.

In step S216, the process determines if the current frame 501A is the last frame of an Exchange. If the current frame is the last frame in the Exchange, then in step S220, an integrity test is performed that is described below with respect to FIG. 4. The transfer is completed and RSEQ 109 notifies processor 106A of the completion (for example, via an interrupt).

If the current frame is not the last frame, then in step S218, the process moves to step S200 to receive/process the next frame.

The following example is provided to illustrate, an adaptive aspect of the present invention.

Figure 5D:
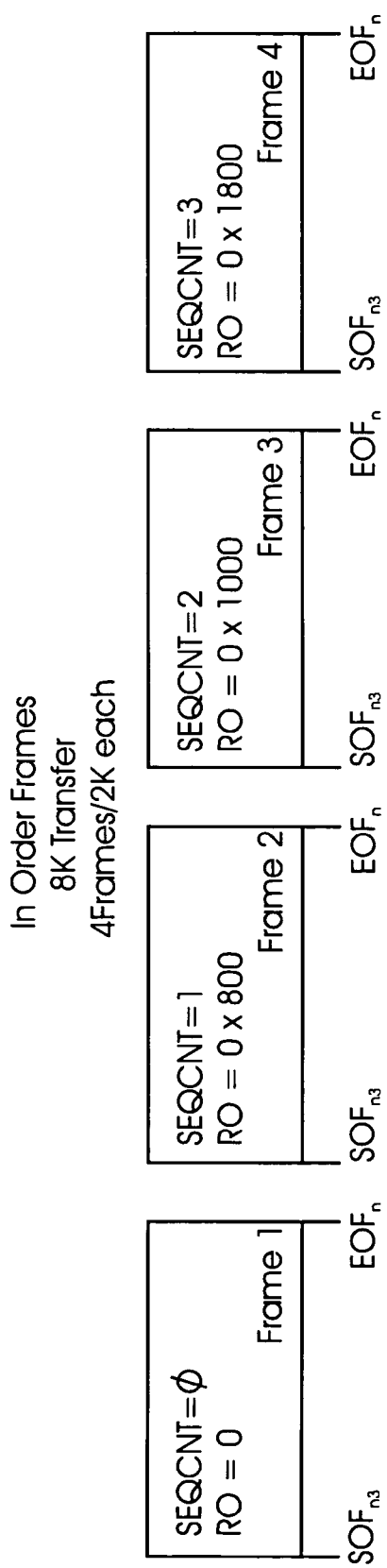
FIG. 5D shows an example of an in order frame receipt.

FIG. 5D shows in-order frames for a total transfer of 8K bytes. Each frame is 2K bytes in size. Frame 1 has a RO value of 0, Frame 2 has a RO value of 0x800; Frame 3 has an RO value of 0x1000 and Frame 4 has a RO value of 0x1800. The SEQ_CNT (503D, FIG. 5C) value shows the number of the frame.

Figure 5E:
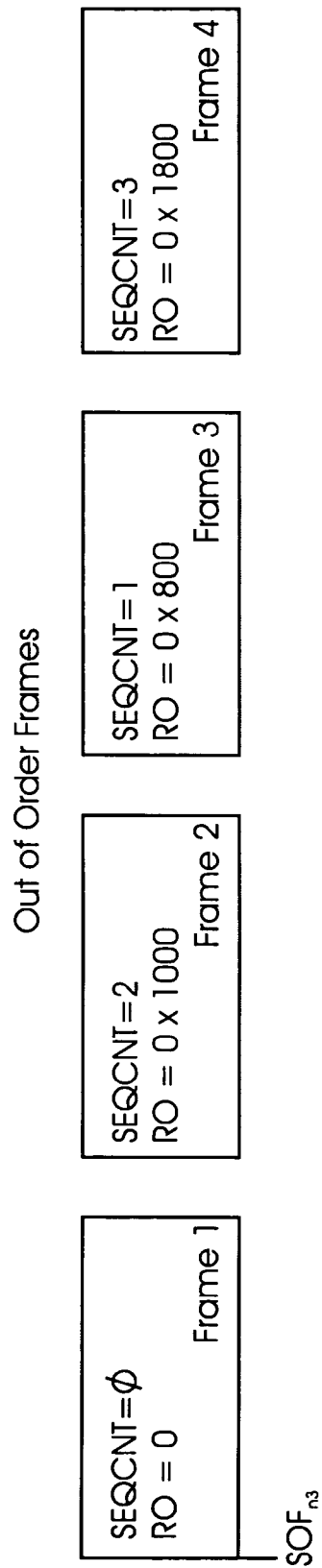
FIG. 5E shows an example of an out of order frame receipt that is handled in one aspect of the present invention.

FIG. 5E shows one example when frames are out order (i.e., a disjoint transfer). For example, Frame 1 has a RO of 0; Frame 2 has RO value of 0x1000; Frame 3 has a RO value of 0x800 and Frame 4 has a RO value of 0x1800.

FIG. 5F shows an out of order list 513 that is used to process the frames shown in FIG. 5F, according to the process flow diagram described above. In list 513, column 519 shows the frame numbers; column 515 shows the starting RO values (as shown in FIG. 5E) and column 517 shows the ending RO+1 value. All the frames are processed based on the process flow described above with respect to FIG. 2B.

Figure 4:
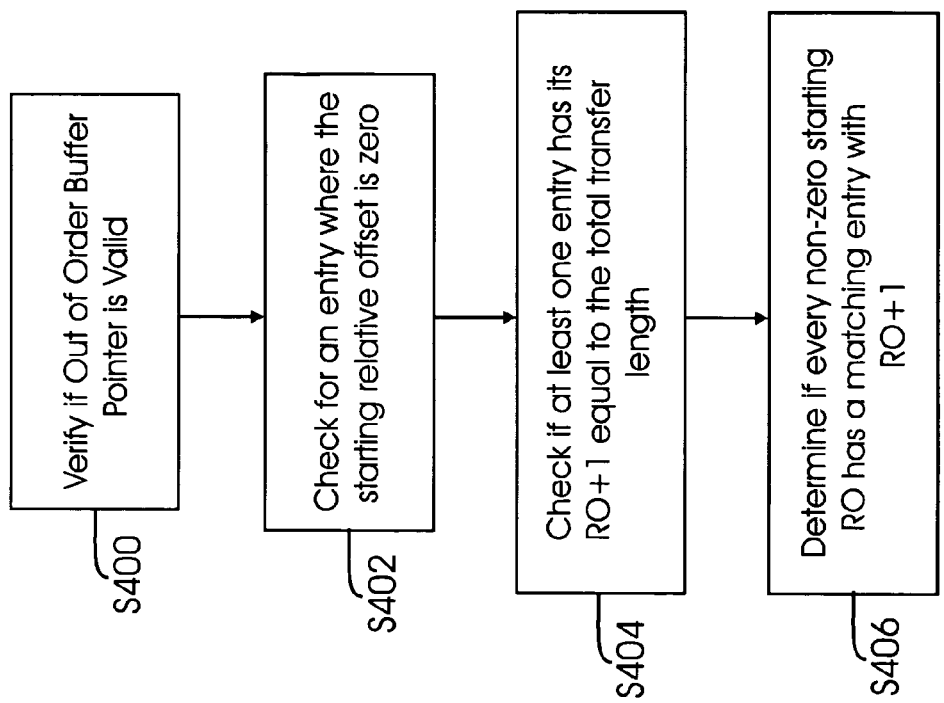
FIG. 4 shows a process flow diagram for performing an integrity check, according to one aspect of the present invention.

Integrity Check:

FIG. 4 shows flow diagram for performing an integrity check after HBA 106 has processed a disjoint transfer. In step S400, processor 106A verifies if an out of order pointer is valid. Processor 106A sets a field that contains a pointer to an out of order input/output control block. This field, when valid, indicates the presence of an out of order transfer.

If the pointer field is valid, then in step S402, processor 106A scans the out of order list (for example, list 513) and checks for an entry where the relative offset value is zero, for example, starting RO field of entry 1 in FIG. 5F.

In step S404, processor 106A checks if any entry has its RO+1 equal to the total length of the transfer.

In step S406, processor 106A checks if every non-zero entry has a matching entry with a RO+1 value.

An example of this integrity check is provided below with respect to the out of order situation.

Four frames of 0x200 bytes each arrive in the following order of starting RO:

-<0, 0x200, 0x600, 0x400>

The following is an out of order list layout for the four frames:

{[0, 0x400],[0x600,0x800][0x400,0x600]};

where [x,y] denotes [Starting RO, Ending RO+1]

For the integrity check described above, there is one starting RO at zero in [0, 0x400] (Step S402);

Also, there is one ending RO+1 equal to total transfer length in [0x600, 0x800] (Step S404); and Every non-zero starting RO has a matching ending RO+1 (for example in [0, 0x400] and [0x400, 0x600], and in [0x600, 0x800] and [0x400, 0x600] (Step S406).

Figure 3:
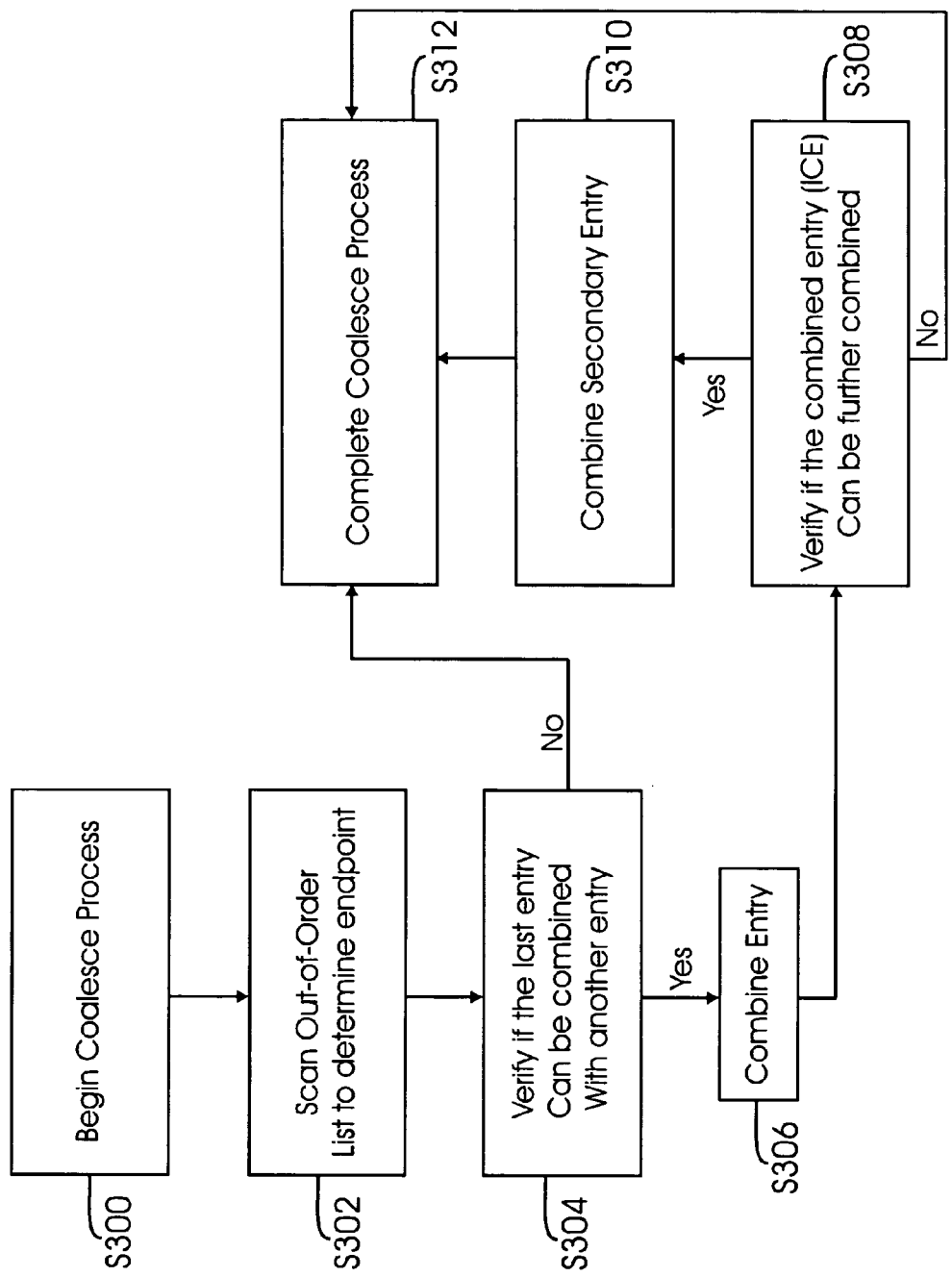
FIG. 3 shows a flow diagram for coalescing entries in a out of order list, according to one aspect of the present invention.

Coalescing Entries:

FIG. 3 shows a flow diagram for coalescing entries in an out of order list (e.g. 513), which streamlines the overall list and improves efficiency. Each time an out of order condition occurs and there is more than one entry in the out of order list (513), then the process combines plural entries (for example, 3 entries) into one so that buffer space is efficiently used and the integrity check described above with respect to FIG. 4 can be performed efficiently.

Turning in detail to FIG. 3, in step S300, a frame is received (for example, 501A) and an entry is added to the out of order list. In step S302, processor 106A scans the out of order list (513) to determine the endpoint (for example, 517, Ending RO+1 in FIG. 5F) of a transfer. Processor 106A determines the last entry before the most recent out of order frame is received. For example, if the current frame 501A is the first out of order frame then frame 501B provides the endpoint of the transfer.

In step S304, processor 106A verifies if the end point of the last entry (for example, 501B) can be used as a key for a starting entry. Processor 106A uses the end point of the last entry as key to see if a matching start point (for example, 515, Starting RO (FIG. 5F) is found. If a matching start point is found, then in step S306, the entry is combined, otherwise, the process ends in step S312.

For illustration purposes, the entry with the matching start point is designated as "intermediate coalesce entry" ("ICE"). The start point of ICE is equal to the end point of the last entry. After the ICE and last entry are combined and only one entry is left, the process ends in step S312.

If more than one entry is left, then in step S308, the starting point of ICE is used as a key to find a matching end point. Again, if no matching endpoint is found, the process ends in step S312.

If a matching endpoint is found, then the matching entry is combined with ICE in step S310 and the process ends in step S312.

The following illustrates how the entries that are close to each other may be combined:

For a 8K bytes transfer, 2K bytes frames arrive as follows (of Starting RO):

0, 0x400, 0x200, 0x600

When frame with Staring RO of 0x600 arrives, the processor (106A) adds an entry to the out of order list 513, which contains the Starting RO. The out of order list layout is as follows after the addition:

{[0, 0x200], [0x400, 0x600], [0x200, 0x400], [0x600, not yet known]}

The process uses the endpoint of last entry [0x200, 0x400] as search key and finds a match with [0x400, 0x600]. Then it combines entries into one entry ("ICE"), [0x200, 0x600] and the out of order list is updated as follows:

{[0, 0x200], [0x200, 0x600], [0x600, not yet known]}

Since there is more than one entry remaining, the process continues as it uses the start point of ICE [0x200, 0x600] as search key and finds a match with [0, 0x200]. Finally it combines these entries and updates out of order list as followed:

{[0, 0x600], [0x600, not yet known]}

The coalescing process ends and RSEQ (109) fills in the "not yet known" endpoint upon data transfer completion.

After coalescing, the final out of order list of {[0, 0x600], [0x600, 0x800]} is used as input to perform integrity test (S220). It is noteworthy that in the foregoing example, without coalescing, the final out of order list would have been in an inefficient form of: {[0, 0x200], [0x200, 0x600], [0x600, 0x800]}.

In one aspect of the present invention, out of order frames are handled efficiently and the integrity check maintains the accuracy of a transfer.

Although the present invention has been described with reference to specific embodiments, these embodiments are illustrative only and not limiting. Many other applications and embodiments of the present invention will be apparent in light of this disclosure and the following claims. For example, automatic DMA selection may be used beyond SANs and Fibre Channel standards. The foregoing adaptive aspects are useful for any networking environment where there is disparity between link transfer rates.

What is claimed is:

1. A method for processing out of order frames received by a host bus adapter coupled to a host system and to a network, comprising:

(a) determining if a received current frame is out of order; wherein a processing module in a receive path of the host bus adapter determines if the received current frame is out of order, notifies a main processor of the host bus adapter if the received current frame is out of order, or processes the received current frame if the frame is not out of order;

(b) if the received current frame is out of order, determining if an exchange identification field in the received current frame identifies the received current frame as part of a range of expected exchanges, wherein an exchange defines an input/output operation to read or write information, and wherein the main processor for the host bus adapter keeps track of all the exchanges and determines if the received current frame is within the range of expected exchanges;

(c) creating an out of order frame list if the received current frame is a first out of order frame and if the received current frame is within the range of expected exchanges; wherein the main processor creates the out of order frame list;

(d) appending an existing out of order frame list if the received current frame is not the first out of order frame and if the received current frame is within the range of expected exchanges;

(e) scanning the out of order frame list for determining if an end point of a last entry in the out of order frame list before the received out of order frame, matches a starting point of another entry; wherein the main processor scans the out of order frame list;

(f) coalescing the last entry with the other entry whose starting point matches the end point of the last entry such that more than one out of order frame entries in the out of order frame list are combined as a single entry; wherein the main processor coalesces the last entry with the other entry; and (g) notifying the processing module in the receive path to process the out of order received current frame, wherein the main processor notifies the processing module after creating the out of order frame list or amending the existing out of order frame list.

2. The method of claim 1, wherein the received current frame is discarded by the main processor after determining that the received current frame is an out of order frame and is not within the range of expected exchanges.

3. The method of claim 1, wherein the received current frame is determined to be out of order after comparing a relative offset value of the received current frame and a relative offset value of a received frame that was processed before the received current frame; and the processing module in the receive path compares the relative offset values.

4. The method of claim 1, wherein if the received current frame is the last frame of the exchange, then the out of order frame list is scanned by the main processor of the host bus adapter to perform an integrity test.

5. A method for performing an integrity check after a disjoint transfer of received frames is processed by a host bus adapter using an out of order frame list, comprising:

(i) verifying if an out of order pointer is valid to indicate presence of an out of order transfer;

wherein a main processor for the host bus adapter (a) determines if a received current frame is within a range of expected exchanges; (b) creates the out of order frame list if the received current frame is a first out of order frame; (c) appends the out of order frame list if the current frame is not the first out of order frame; (d) scans the out of order frame list for determining if an end point of a last entry in the out of order frame list before the received out of order frame, matches a starting point of another entry; (e) coalesces the last entry with the other entry whose starting point matches the end point of the last entry such that more than one out of order frame entries in the out of order frame list are combined as a single entry and (f) verifies if the out of order pointer is valid;

(ii) determining if an entry in the out of order frame list has a relative offset value of zero;

(iii) determining if at least one entry in the out of order frame list has a relative offset value equal to a total transfer length of an exchange, wherein the exchange defines an input/output operation to read or write information, and wherein the main processor for the host bus adapter tracks all the exchanges; and (iv) determining if every non-zero relative offset of an entry in the out of order frame list sequentially matches with another entry in the out of order frame list.

6. The method of claim 5, wherein the main processor for the host bus adapter maintains the out of order frame list after a processor in a receive path determines that a received frame is out of order.

7. The method of claim 1, wherein the starting point of the other entry is used as a key to find a next matching entry in the out of order frame list.

8. A host bus adapter ("HBA") for processing out of order frames, comprising:

a first processor in a receive path of the HBA for determining if a received current frame is out of order; and a second processor that (a) keeps track of all exchanges, wherein the exchange defines an input/output operation to read or write information; (b) determines if the received current frame is within a range of expected exchanges; (c) creates an out of order frame list if the received current frame is a first out of order frame; (d) appends an existing out of order frame list if the current frame is not the first out of order frame; (e) scans the out of order frame list for determining if an end point of a last entry in the out of order frame list before the received out of order frame, matches a starting point of another entry; (f) coalesces the last entry with the other entry whose starting point matches the end point of the last entry such that more than one out of order frame entries in the out of order frame list are combined as a single entry; and (g) notifies the first processor in the receive path to process the out of order received current frame.

9. The HBA of claim 8, wherein if the received current frame is not within the range of expected exchanges, then the received current frame is discarded.

10. The HBA of claim 8, wherein the received current frame is out of order based on a comparison of a relative offset of the received current frame and a relative offset of a frame that is processed before the received current frame.

11. The HBA of claim 8, wherein if the received current frame is the last frame then the out of order frame list is scanned to perform an integrity test.

12. A host bus adapter ("HBA") for performing an integrity check after a disjoint transfer of received frames is processed by the host bus adapter using an out of order frame list comprising:

a processor for (a) determining if a received current frame is within a range of expected exchanges; (b) creating the out of order frame list if the received current frame is a first out of order frame; (c) appending the out of order frame list if the current frame is not the first out of order frame; (d) scanning the out of order frame list for determining if an end point of a last entry in the out of order frame list before the received out of order frame, matches a starting point of another entry; (e) coalescing the last entry with the other entry whose starting point matches the end point of the last entry such that more than one out of order frame entries in the out of order frame list are combined as a single entry; (f) determining if an out of order pointer is valid to indicate presence of an out of order transfer; (g) determining if an entry in the out of order frame list has a relative offset value of zero; (h) determining if at least one entry has a relative offset value equal to a total transfer length of an exchange, wherein the exchange defines an input/output operation to read or write information, and wherein the processor keeps track of the exchange; and (i) determining if every non-zero relative offset of an entry in the out of order frame list sequentially matches with another entry in the out of order frame list.

13. The HBA of claim 12, wherein the out of order list is maintained by the processor in a memory after a processor in a receive path of the HBA determines that a received frame is out of order.

14. The method of claim 1, wherein the processing module for the receive path of the host bus adapter determines the expected exchange by examining the identification field of a frame header; and the main processor of the host bus adapter maintains a list in memory for a plurality of expected exchanges at any given time.

15. The method of claim 14, wherein the processing module of the receive path compares a relative offset of a current frame with a relative offset of a previous frame and the processing module notifies the main processor if the current frame is out of order.

16. The method of claim 1, wherein the out of order frame list is maintained in memory by the main processor for the host bus adapter.

17. The method of claim 5, wherein the out of order list is maintained in a memory after the processor in the receive path of the host bus adapter determines that a received frame is out of order.

18. The method of claim 6, wherein the processor for the receive path of the host bus adapter compares a relative offset of a current frame with a relative offset of a previous frame and the processor of the receive path notifies the main processor of the host bus adapter if the current frame is out of order.

19. The method of claim 1, wherein the out of order frame list is maintained in a memory after a processor in a receive path of the host bus adapter determines that a received frame is out of order.

20. The method of claim 19, wherein the processor in the receive path of the host bus adapter compares a relative offset of a current frame with a relative offset of a previous frame and the processor in the receive path notifies a main processor of the host bus adapter if the current frame is out of order.

21. The method of claim 1, further comprising: verifying if an out of order pointer is valid to indicate presence of an out of order transfer, wherein the main processor for the host bus adapter verifies if the out of order pointer is valid;
determining if an entry in the out of order frame list has a relative offset value of zero;
determining if at least one entry in the out of order frame list has a relative offset value equal to a total transfer length of an exchange; and
determining if every non-zero relative offset of an entry in the out of order frame list sequentially matches with another entry in the out of order frame list.

* * * * *

UNITED STATES PATENT AND TRADEMARK OFFICE
CERTIFICATE OF CORRECTION

| | | |
|---|---|---|
| PATENT NO. | : 7,676,611 B2 | Page 1 of 1 |
| APPLICATION NO. | : 10/956955 | |
| DATED | : March 9, 2010 | |
| INVENTOR(S) | : Ben K. Hui et al. | |

It is certified that error appears in the above-identified patent and that said Letters Patent is hereby corrected as shown below:

On the Title page, in Item (54), in column 1, in Title, line 2, delete "ORDERS" and insert -- ORDER --, therefor.

In column 1, line 2, delete "ORDERS" and insert -- ORDER --, therefor.

Signed and Sealed this

Twenty-sixth Day of October, 2010

David J. Kappos
*Director of the United States Patent and Trademark Office*